(12) United States Patent
Southcombe et al.

(10) Patent No.: US 9,720,872 B2
(45) Date of Patent: Aug. 1, 2017

(54) AUTO-CONFIGURATION OF DEVICES BASED UPON CONFIGURATION OF SERIAL INPUT PINS AND SUPPLY

(71) Applicant: RF Micro Devices, Inc., Greensboro, NC (US)

(72) Inventors: William David Southcombe, San Diego, CA (US); Christopher Truong Ngo, Queen Creek, AZ (US); Joseph Hubert Colles, Bonsall, CA (US)

(73) Assignee: Qorvo US, Inc., Greensboro, NC (US)

( * ) Notice: Subject to any disclaimer, the term of this patent is extended or adjusted under 35 U.S.C. 154(b) by 343 days.

(21) Appl. No.: 14/511,602

(22) Filed: Oct. 10, 2014

(65) Prior Publication Data

US 2015/0106541 A1    Apr. 16, 2015

Related U.S. Application Data (60) Provisional application No. 61/889,293, filed on Oct. 10, 2013.

(51) Int. Cl.
*G06F 13/42* (2006.01)

(52) U.S. Cl.
CPC ...... *G06F 13/4221* (2013.01); *G06F 13/4282* (2013.01)

(58) Field of Classification Search
CPC .... G06F 13/00; G06F 9/00; G06F 2213/0052; G06F 13/428
USPC .......................................... 710/110, 8–9, 15
See application file for complete search history.

(56) References Cited

U.S. PATENT DOCUMENTS

| | | | |
|---|---|---|---|
| 2005/0135153 A1* | 6/2005 | Feng | G11C 7/20 365/185.22 |
| 2005/0268000 A1* | 12/2005 | Carlson | G06F 13/4081 710/15 |
| 2008/0265838 A1* | 10/2008 | Garg | G06F 1/266 320/115 |
| 2009/0177824 A1* | 7/2009 | Wang | H04L 12/403 710/110 |
| 2009/0222609 A1* | 9/2009 | Ji | G06F 13/4095 710/302 |
| 2011/0173447 A1* | 7/2011 | Zhang | H04B 3/542 713/168 |
| 2011/0197000 A1* | 8/2011 | Hsieh | G06F 13/42 710/110 |
| 2011/0244728 A1* | 10/2011 | Chang | H01R 31/06 439/628 |
| 2012/0072628 A1* | 3/2012 | Crockett | G06F 13/4291 710/110 |

(Continued)

*Primary Examiner* — Christopher Shin
(74) *Attorney, Agent, or Firm* — Withrow & Terranova, P.L.L.C.

(57) ABSTRACT

A device includes a memory, at least two input/output (IO) pins, and slave identifier (ID) selection circuitry. The memory stores a slave ID, which identifies the device to other devices in a serial communication process. The slave ID selection circuitry changes the stored slave ID based on which one of the IO pins is coupled to a supply voltage. By changing the slave ID of the device based on which one of the IO pins is coupled to a supply voltage, a number of devices with otherwise identical slave IDs may change their slave IDs in order to participate in a serial communication process on the same bus. Further, the slave ID of the device may be changed without using an additional IO pin on the device.

26 Claims, 9 Drawing Sheets

(56) References Cited

U.S. PATENT DOCUMENTS

| | | | |
|---|---|---|---|
| 2013/0132626 A1* | 5/2013 | Furlan | G06F 13/36 710/110 |
| 2013/0198427 A1* | 8/2013 | Leitner | G06F 13/4291 710/110 |
| 2013/0268231 A1* | 10/2013 | Sato | G08C 19/00 702/141 |
| 2016/0188348 A1* | 6/2016 | Hung | G06F 9/4411 710/302 |

* cited by examiner

AUTO-CONFIGURATION OF DEVICES BASED UPON CONFIGURATION OF SERIAL INPUT PINS AND SUPPLY

RELATED APPLICATIONS

This application claims the benefit of U.S. provisional patent application Ser. No. 61/889,293, filed Oct. 10, 2013, the disclosure of which is incorporated herein by reference in its entirety.

FIELD OF THE DISCLOSURE

The present disclosure relates to serial communication and serial communication devices.

BACKGROUND

Serial communication is a method of electronic communication in which data is sent consecutively, one bit after the other. Over the years, serial communication has evolved to include a number of different systems and protocols, each with their own advantages and drawbacks. One exemplary serial communication system is a master-slave serial communication system, as illustrated by the serial communication system 10 in FIG. 1. In the serial communication system 10 shown in FIG. 1, a master device 12 initiates communication with one or more slave devices 14 by sending digital data to one or more of the slave devices 14 via a first input/output (IO) pin 16 and a second IO pin 18. A third IO pin 20 provides a supply voltage ($V_{DD}$) from the master device 12 to each one of the slave devices 14. Together, the connections between the master device 12 and the slave devices 14 form a serial communication bus 22. When three or more devices communicate on the same serial communication bus 22, it is generally necessary to identify for which device data sent over the serial bus is intended. Otherwise, each one of the slave devices 14 may receive and act upon the data simultaneously, which may be undesirable in many situations.

Figure 1:
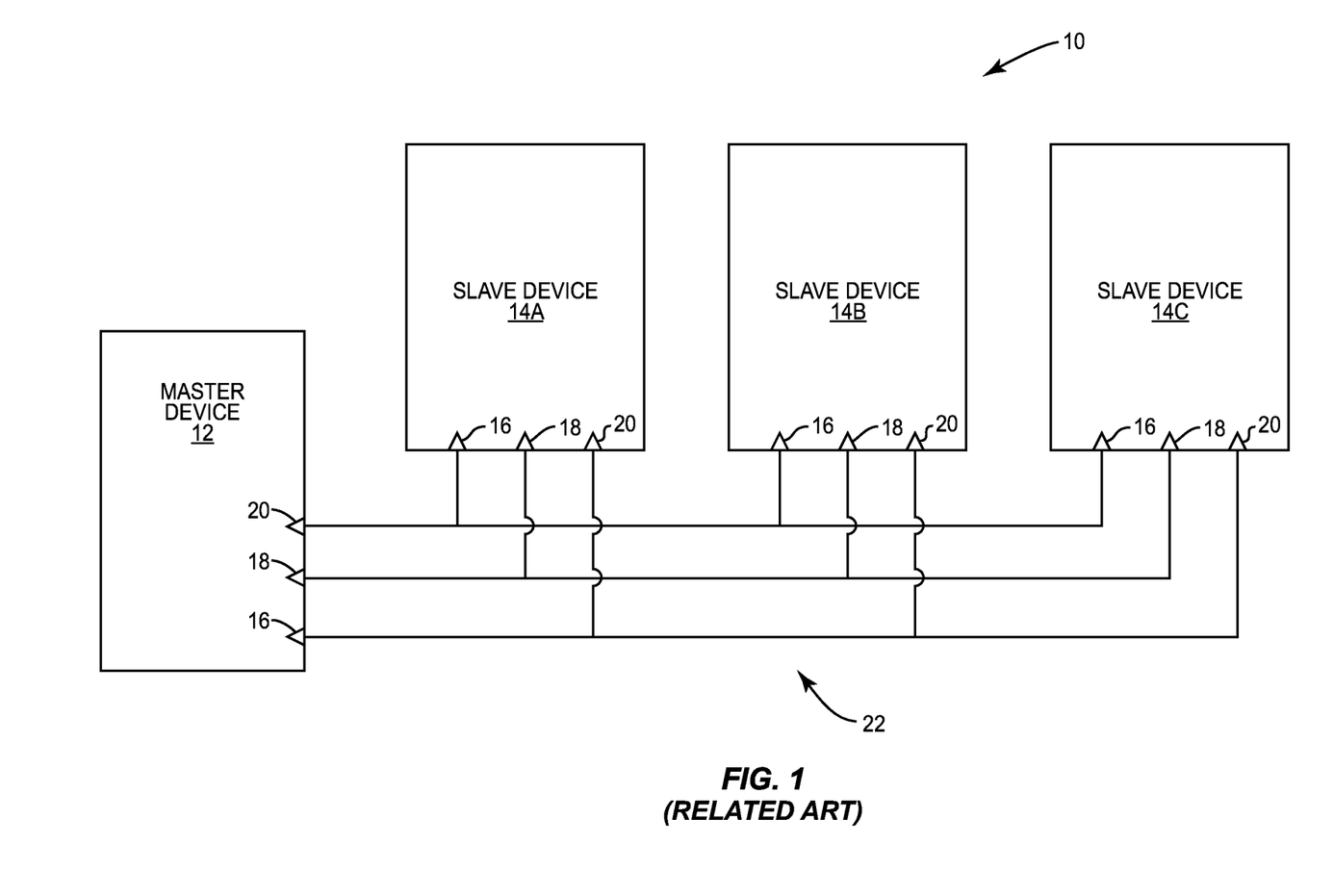
FIG. 1 is a block diagram of a master/slave serial communication system.

One way to indicate the device for which data on the serial bus is intended is by associating each slave device 14 with a slave identifier (ID), which is hard-coded into a memory of the slave device 14. Data sent over the serial communication bus 22 may then include the slave ID of the slave device 14 for which the data is intended. The slave ID provided in the data is read by each slave device 14 and the data is discarded if it is not intended for the device. While such a method may work for distinct slave devices 14 including unique slave IDs, it fails when two or more of the slave devices 14, and thus their slave IDs, are identical. This may be problematic when the functionality of two identical slave devices 14 is required in a system, as it may require a manufacturer of the slave devices 14 to manufacture variants of identical devices with unique slave IDs, adding both cost and complexity to the manufacturing process.

One way manufacturers have attempted to solve this problem is by providing devices with slave IDs that can be changed, for example, by blowing one or more eFUSES in the device. Unfortunately, implementation costs associated with such a memory system (e.g., size, test time, design complexity) are often prohibitive. In an additional effort to provide devices with unique slave IDs, manufacturers have produced devices that can change their slave ID based on the receipt of a signal at a general purpose IO (GPIO) pin 24 such as that shown on each one of the slave devices 14 in FIG. 2. In the slave devices shown in FIG. 2, the slave ID of each one of the devices may change based on whether or not a signal is applied to the GPIO pin 24. Accordingly, two identical slave devices 14 may be associated with unique slave IDs by providing a signal to the GPIO pin 24 of one of the slave devices 14 but not the other. Although effective, such an approach requires the use of the GPIO pin 24 in addition to the first IO pin 16, the second IO pin 18, and the third IO pin 20. Further, separate signal routing (e.g., via traces on a PCB) is required for the GPIO pin 24 of each slave device 14, thereby adding additional complexity and cost to the serial communication system 10 shown in FIG. 2.

Figure 2:
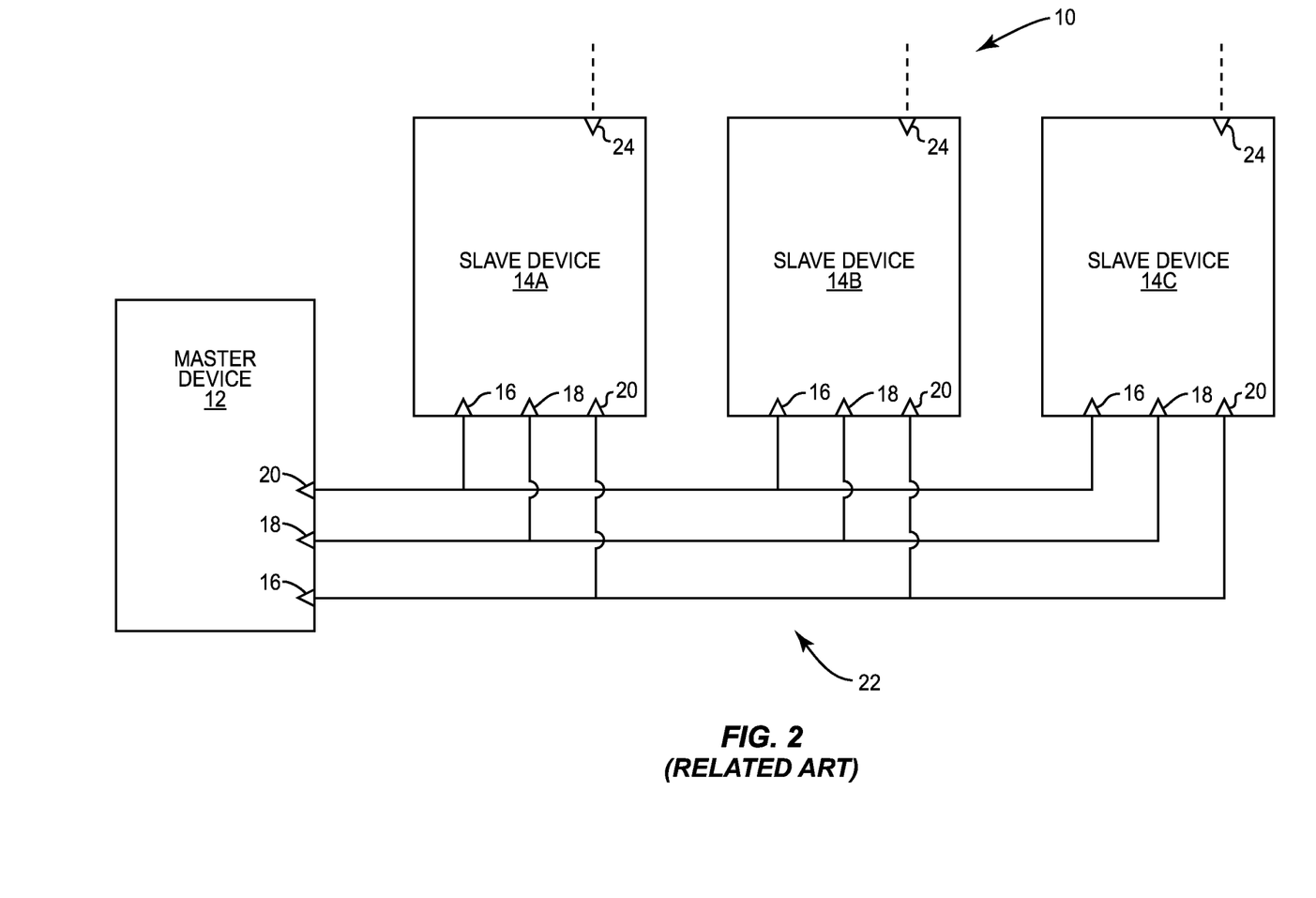
FIG. 2 is a block diagram of a master/slave serial communication system.

Another way manufacturers have attempted to provide devices with unique slave IDs is by producing devices that can change their slave ID based on the order of signals received by the first IO pin 16 and the second IO pin 18. For example, if a serial data signal is received at the first IO pin 16 before the second IO pin 18, a first slave ID can be used for the device, whereas if a signal is received at the second IO pin 18 before the first IO pin 16, a second slave ID can be used for the device. Signals between the first IO pin 16 of two identical slave devices 14 and the master device 12 can be oppositely routed so that each one of the slave devices 14 are associated with different slave IDs. Unfortunately, provisioning a unique slave ID for each one of the slave devices 14 in this manner makes the slave ID of each one of the slave devices 14 susceptible to noise, as the slave devices 14 necessarily must respond to and latch their respective slave IDs based on signal bursts of a relatively short duration received on the first IO pin 16 and the second IO pin 18 if the serial communication between devices in the serial communication system 10 is to occur at any appreciable speed.

Figure 3:
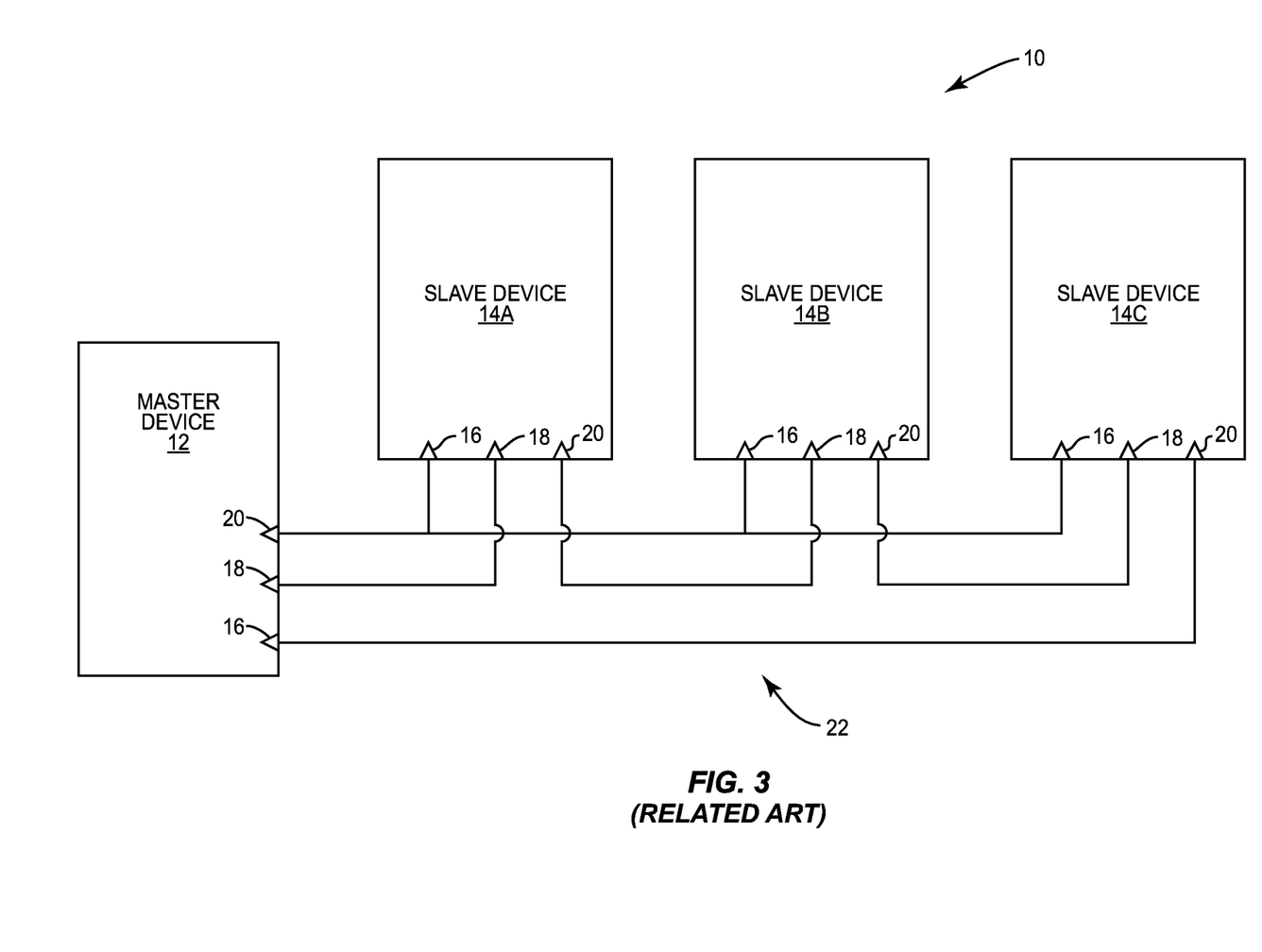
FIG. 3 is a block diagram of a master/slave serial communication system.

Yet another way many have attempted to satisfy the requirement of unique slave IDs for each slave device 14 is to connect the slave devices 14 in series as shown in FIG. 3. When the slave devices 14 are connected in series as shown in FIG. 3, data must be propagated by each one of the slave devices 14 located before the end destination of the data. While in FIGS. 1 and 2 one of the IO pins used for data typically carries a clock signal and the other carries a serial data signal, in FIG. 3 a clock signal is not used. Although this allows multiple identical slave devices 14 to be used together, the size of the data sent via the serial bus 24 increases proportionally with the number of slave devices 14 used, thereby decreasing the performance of the serial communication system 10.

Accordingly, there is a need for a serial communication device capable of provisioning a unique slave ID with minimal use of additional pins or further infrastructure in a serial communication system.

SUMMARY

The present disclosure relates to serial communication and serial communication devices. In one embodiment, a device includes a memory, at least two input/output (IO) pins, and slave identifier (ID) selection circuitry. The memory stores a slave ID, which identifies the device to other devices in a serial communication system. The slave ID selection circuitry changes the stored slave ID based on which one of the IO pins is coupled to a supply voltage. By changing the slave ID of the device based on which one of the IO pins is coupled to a supply voltage, a number of devices with otherwise identical slave IDs may change their slave IDs in order to participate in a serial communication process on the same bus. Further, the slave ID of the device may be changed without using an additional IO pin on the device.

In one embodiment, the device is powered by the supply voltage delivered to the one of the IO pins. The device may then use the IO pin not coupled to the supply voltage for serial communication.

In one embodiment, the device includes at least three IO pins. The two IO pins not coupled to the supply voltage may be used by the device for serial communication. Additionally, the slave ID selection circuitry may then additionally change the slave ID based on which one of the IO pins used for serial communication receives a signal first. Changing the slave ID based on which one of the IO pins used for serial communication receives a signal first allows for additional slave IDs to be selected for the device without using additional IO pins on the device.

In one embodiment, the device includes at least one general purpose IO (GPIO) pin. The slave ID selection circuitry may then additionally change the slave ID of the device based on a signal received at the at least one GPIO pin.

In one embodiment, a serial communication system includes a master device and a slave device. The slave device includes a memory, at least two input/output (IO) pins, and slave identifier (ID) selection circuitry. The memory stores a slave ID, which identifies the device to other devices in a serial communication process. The slave ID selection circuitry changes the stored slave ID based on which one of the IO pins is coupled to a supply voltage. By changing the slave ID of the device based on which one of the IO pins is coupled to a supply voltage, a number of devices with otherwise identical slave IDs may change their slave IDs in order to participate in a serial communication process on the same bus. Further, the slave ID of the device may be changed without using an additional IO pin on the device.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
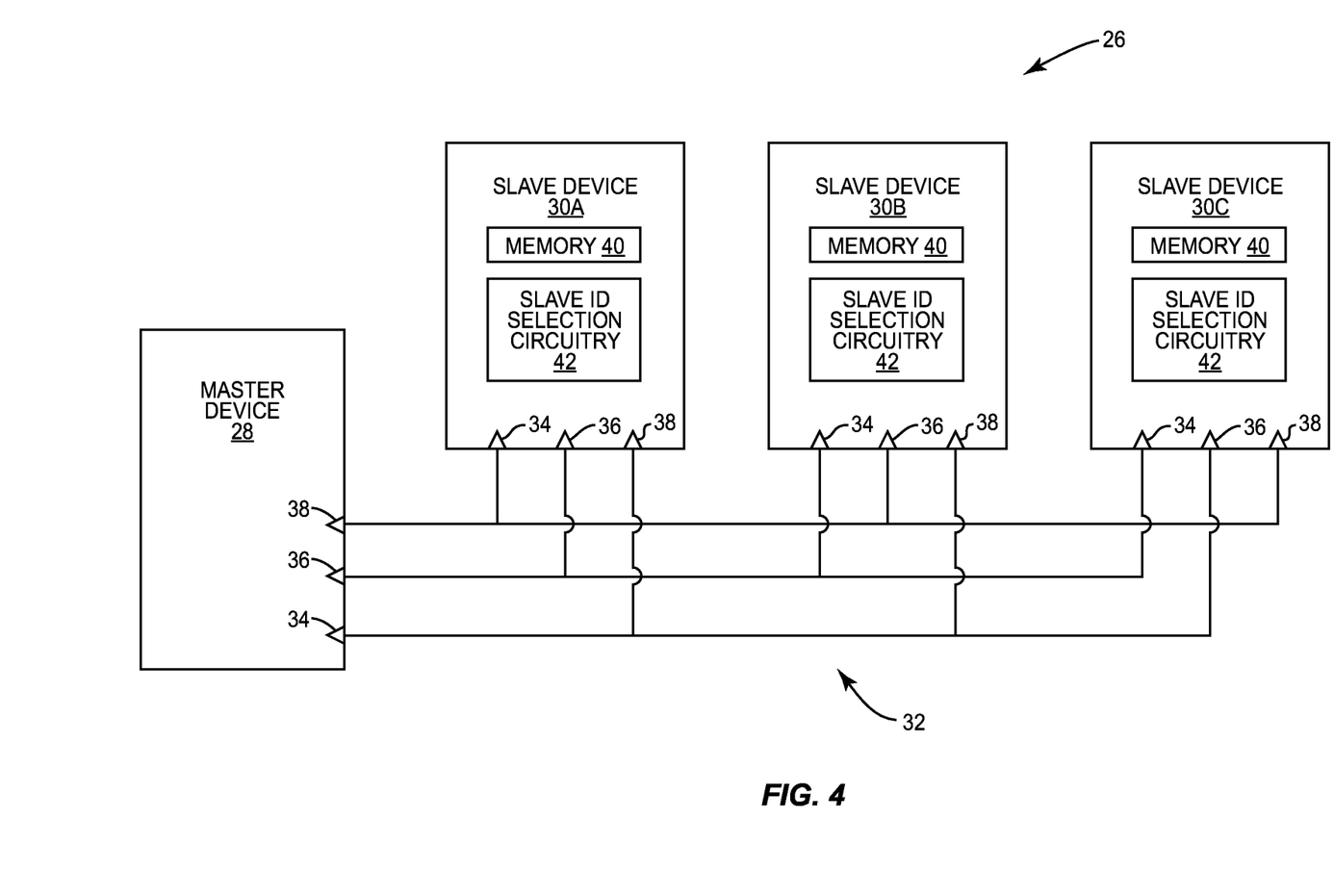
FIG. 4 is a block diagram of a master/slave serial communication system according to one embodiment of the present disclosure.

FIG. 4 shows a serial communication system 26 according to one embodiment of the present disclosure. The serial communication system 26 may be a master/slave serial communication system including a master device 28, a number of slave devices 30, and a serial communication bus 32. Each one of the master device 28 and the slave devices 30 may include a first input/output (IO) pin 34, a second IO pin 36, and a third IO pin 38. In one embodiment, the first IO pin 34 of the master device 28 is configured to provide a first serial data signal SER_D1, the second IO pin 36 of the master device 28 is configured to supply a second serial data signal SER_D2, and the third IO pin 38 of the master device 28 is configured to provide a supply voltage ($V_{DD}$). However, the signals provided by each one of the IO pins of the master device 28 may be readily interchanged. The first IO pin 34, the second IO pin 36, and the third IO pin 38 of each one of the slave devices 30 may be used as either a data pin or a supply voltage ($V_{DD}$) pin, as discussed below. In order to identify the slave device 30 with which the master device 28 wishes to communicate, the master device 28 may provide a slave ID of the slave device 30 that a particular segment of data is intended. Accordingly, each one of the slave devices 30 should be associated with a unique slave ID in order to be separately addressable by the master device 30. In one embodiment, a slave ID associated with each slave device 30 is stored in a respective memory 40 associated with each device.

As discussed above, it may often be desirable to include two or more identical slave devices 30 in the serial communication system 26. The identical slave devices 30 may be manufactured by the same entity, or share the same functionality. Generally, each one of the identical slave devices 30 will include the same slave ID, as it is often complex and expensive to manufacture identical slave devices 30 with different slave IDs. Accordingly, each slave device 30 may include slave identifier (ID) selection circuitry 42 configured to change the slave ID associated with the slave device 30 based on the particular IO pin to which the supply voltage ($V_{DD}$) from the third IO pin 38 of the master device 28 is provided.

As shown in FIG. 4, the first IO pin 34 of a first slave device 30A is coupled to the third IO pin 38 of the master device 28, the second IO pin 36 of the first slave device 30A is coupled to the second IO pin 36 of the master device 28, and the third IO pin 38 of the first slave device 30A is coupled to the first IO pin 34 of the master device 28. Accordingly, the supply voltage ($V_{DD}$) is supplied to the first IO pin 34 of the first slave device 30A, which causes the slave ID selection circuitry 42 of the first slave device 30A to associate the first slave device 30A with a first slave ID. The first IO pin 34 of a second slave device 30B is coupled to the second IO pin 36 of the master device 28, the second IO pin 36 of the second slave device 30B is coupled to the third IO pin 38 of the master device 28, and the third IO pin 38 of the second slave device 30B is coupled to the first IO pin 34 of the master device 28. Accordingly, the supply voltage ($V_{DD}$) is supplied to the second IO pin 36 of the second slave device 30B, which causes the slave ID selection circuitry 42 of the second slave device 30B to associate the second slave device 30B with a second slave ID. The first IO pin 34 of a third slave device 30C is coupled to the second IO pin 36 of the master device 28, the second IO pin 36 of the third slave device 30C is coupled to the first IO pin 34 of the master device 28, and the third IO pin 38 of the third slave device 30C is coupled to the third IO pin 38 of the master device 28. Accordingly, the supply voltage ($V_{DD}$) is supplied to the third IO pin 38 of the third slave device 30C, which causes the slave ID selection circuitry 42 of the third slave device 30C to associate the third slave device 30C with a third slave ID.

By including the slave ID selection circuitry 42 in each one of the slave devices 30, the slave ID of the slave devices 30 may be changed simply by routing the supply voltage ($V_{DD}$) to an appropriate one of the first IO pin 34, the second IO pin 36, and the third IO pin 38. Accordingly, no IO pins are needed in addition to those normally used for serial communication between the master device 28 and the slave devices 30, which reduces the cost and complexity of the serial communication system 26 while simultaneously allowing otherwise identical slave devices 30 to be used together. Table 1 details the various slave IDs available for each slave device 30 based on the IO pin to which the supply voltage ($V_{DD}$) is provided.

TABLE 1

| Slave ID | First IO Pin | Second IO Pin | Third IO Pin |
|---|---|---|---|
| 0 | $V_{DD}$ | SER_D1 | SER_D2 |
| 1 | SER_D2 | $V_{DD}$ | SER_D1 |
| 2 | SER_D2 | SER_D1 | $V_{DD}$ |

Figure 5:
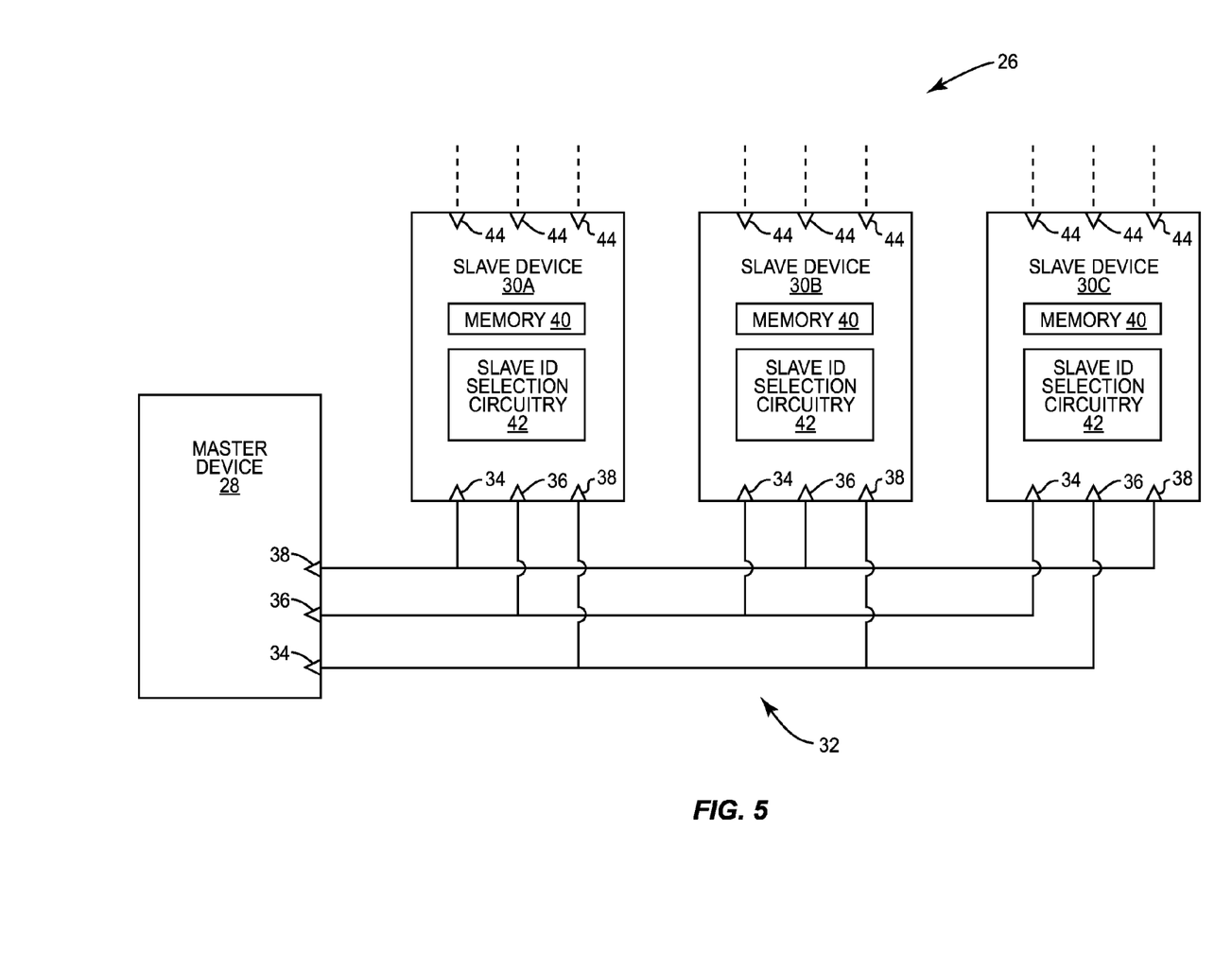
FIG. 5 is a block diagram of a master/slave serial communication system according to another embodiment of the present disclosure.

As shown in Table 1, three unique slave IDs are available for each one of the slave devices 30. While an effective way to differentiate otherwise identical slave devices 30 using only the IO pins necessary for serial communication, some applications may require the use of more than three identical slave devices 30. Accordingly, FIG. 5 shows a serial communication system 26 according to another embodiment of the present disclosure. The serial communication system 26 shown in FIG. 5 is substantially similar to that shown in FIG. 4, except that each one of the slave devices 30 includes a general purpose IO (GPIO) pin 44 in addition to the first IO pin 34, the second IO pin 36, and the third IO pin 38. The GPIO pin 44 may be used by the slave ID selection circuitry 42 in addition to the first IO pin 34, the second IO pin 36, and the third IO pin 38 in order to select a slave ID for association with a particular slave device 30. For example, the slave ID selection circuitry 42 may select a slave ID for a particular slave device 30 based on the IO pin to which the supply voltage ($V_{DD}$) is provided and the presence of a particular signal at the GPIO pin 44. In one embodiment, the slave ID selection circuitry 42 determines whether a signal above a given threshold (e.g., a binary signal) is present at the GPIO pin 44 and determines a slave ID for the slave device 30 based thereon. Table 2 details the various slave IDs available for each slave device 30 based on the IO pin to which the supply voltage ($V_{DD}$) is provided as well as the presence or absence of a signal at the GPIO pin 44.

TABLE 2

| Slave ID | First IO Pin | Second IO Pin | Third IO Pin | GPIO Pin |
|---|---|---|---|---|
| 0 | $V_{DD}$ | SER_D1 | SER_D2 | 0 |
| 1 | SER_D2 | $V_{DD}$ | SER_D1 | 0 |
| 2 | SER_D2 | SER_D1 | $V_{DD}$ | 0 |
| 3 | $V_{DD}$ | SER_D1 | SER_D2 | 1 |
| 4 | SER_D2 | $V_{DD}$ | SER_D1 | 1 |
| 5 | SER_D2 | SER_D1 | $V_{DD}$ | 1 |

As shown in Table 2, six unique slave IDs are available for each one of the slave devices 30. Accordingly, the number of identical slave devices 30 that can be used in the serial communication system 26 is effectively doubled. While providing the GPIO pin 44 and signal routing circuitry (e.g., PCB traces) therefore, the complexity of the serial communication system 26 may increase, however, this may be necessary in circumstances requiring a large number of identical slave devices 30. In additional embodiments, any number of GPIO pins may be added to the slave devices 30 and used in conjunction with the methods described above for associating a unique slave ID with each slave device 30. For example, Table 3 illustrates that twelve unique slave IDs are available for association with a particular slave device 30 when the slave device 30 includes two GPIO pins in addition to the first IO pin 34, the second IO pin 36, and the third IO pin 38.

TABLE 3

| Slave ID | First IO Pin | Second IO Pin | Third IO Pin | First GPIO Pin | Second GPIO Pin |
|---|---|---|---|---|---|
| 0 | $V_{DD}$ | SER_D1 | SER_D2 | 0 | 0 |
| 1 | SER_D2 | $V_{DD}$ | SER_D1 | 0 | 0 |
| 2 | SER_D2 | SER_D1 | $V_{DD}$ | 0 | 0 |
| 3 | $V_{DD}$ | SER_D1 | SER_D2 | 1 | 0 |
| 4 | SER_D2 | $V_{DD}$ | SER_D1 | 1 | 0 |
| 5 | SER_D2 | SER_D1 | $V_{DD}$ | 1 | 0 |
| 6 | $V_{DD}$ | SER_D1 | SER_D2 | 0 | 1 |
| 7 | SER_D2 | $V_{DD}$ | SER_D1 | 0 | 1 |
| 8 | SER_D2 | SER_D1 | $V_{DD}$ | 0 | 1 |
| 9 | $V_{DD}$ | SER_D1 | SER_D2 | 1 | 1 |
| 10 | SER_D2 | $V_{DD}$ | SER_D1 | 1 | 1 |
| 11 | SER_D2 | SER_D1 | $V_{DD}$ | 1 | 1 |

Figure 6:
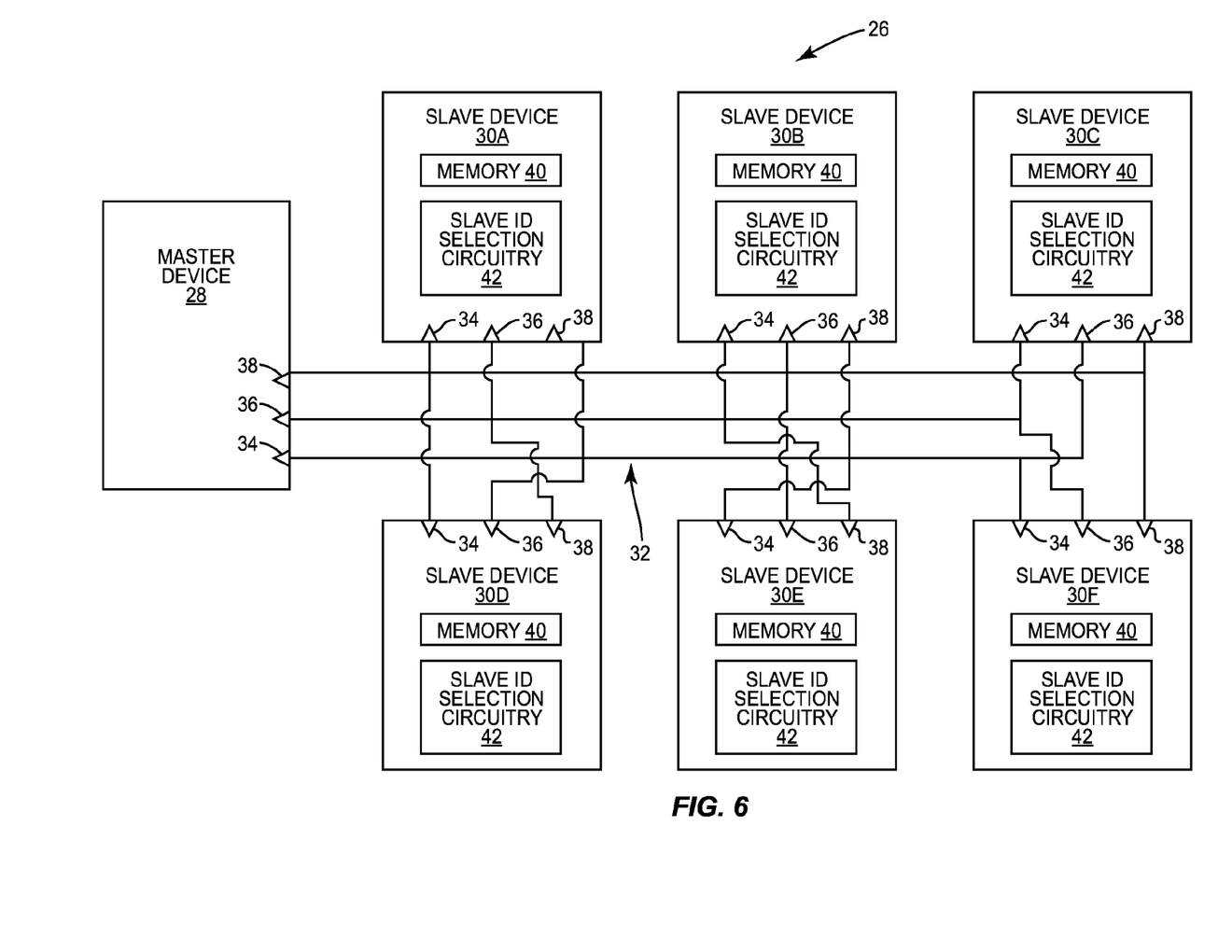
FIG. 6 is a block diagram of a master/slave serial communication system according to another embodiment of the present disclosure.

In some embodiments, the addition or use of GPIO pins to assign a slave ID to each slave device 30 may be impractical or undesirable. However, a need may still exist to use more than three identical slave devices 30 in the serial communication system 26. Accordingly, FIG. 6 shows the serial communication system 26 according to an additional embodiment of the present disclosure. The serial communication system 26 shown in FIG. 6 is substantially similar to that shown in FIG. 5, except that the slave ID selection circuitry 42 of each one of the slave devices 30 is further configured to select a slave ID for association with a particular slave device 30 based on the order of signals received at the IO pins not coupled to the supply voltage ($V_{DD}$), as discussed below. Accordingly, the number of unique slave IDs available for each slave device 30 is effectively doubled when compared to the serial communication system discussed above with respect to FIG. 4.

Assuming that one of the first serial data signal SER_D1 and the second serial data signal SER_D2 is consistently asserted before the other, the serial communication system 26 operates as described below. Since the first IO pin 34 of the first slave device 30A is coupled to the third IO pin 38 of the master device 28, the second IO pin 36 of the first slave device 30A is coupled to the second IO pin 36 of the master device 28, and the third IO pin 38 of the first slave device 30A is coupled to the first IO pin 34 of the master device 28, the supply voltage ($V_{DD}$) is supplied to the first IO pin 34 of the first slave device 30A. Additionally, the first serial data signal SER_D1 is received first at the second IO pin 36 of the first slave device 30A. The combination of these conditions causes the slave ID selection circuitry 42 of the first slave device 30A to associate the first slave device 30A with a first slave ID.

Since the first IO pin 34 of a second slave device 30B is coupled to the second IO pin 36 of the master device 28, the second IO pin 36 of the second slave device 30B is coupled to the third IO pin 38 of the master device 28, and the third IO pin 38 of the second slave device 30B is coupled to the first IO pin 34 of the master device 28, the supply voltage ($V_{DD}$) is supplied to the second IO pin 36 of the second slave device 30B. Additionally, the first serial data signal SER_D1 is received first at the third IO pin 38 of the second slave device 30B. The combination of these conditions causes the slave ID selection circuitry 42 of the second slave device 30B to associate the second slave device 30B with a second slave ID.

Since the first IO pin 34 of a third slave device 30C is coupled to the second IO pin 36 of the master device 28, the second IO pin 36 of the third slave device 30C is coupled to the first IO pin 34 of the master device 28, and the third IO pin 38 of the third slave device 30C is coupled to the third IO pin 38 of the master device 28, the supply voltage ($V_{DD}$) is supplied to the third IO pin 38 of the third slave device 30C. Additionally, the first serial data signal SER_D1 is received first at the second IO pin 36 of the third slave device 30C. The combination of these conditions causes the slave ID selection circuitry 42 of the third slave device 30C to associate the third slave device 30C with a third slave ID.

A fourth slave device 30D is coupled to the serial communication bus 32 in a relatively similar manner to the first slave device 30A, except that the second IO pin 36 of the fourth slave device 30D is coupled to the first IO pin 34 of the master device 28 and the third IO pin 38 of the fourth slave device 30D is coupled to the second IO pin 36 of the master device 28. Accordingly, the fourth slave device 30D will receive the first serial data signal SER_D1 first at the second IO pin 36, thereby causing the slave ID selection circuitry 42 of the fourth slave device 30D to associate the fourth slave device 30D with a fourth slave ID.

A fifth slave device 30E is coupled to the serial communication bus 32 in a relatively similar manner to the second slave device 30B, except that the first IO pin 34 of the fifth slave device 30E is coupled to the first IO pin 34 of the master device 28 and the third IO pin 38 of the fifth slave device 30E is coupled to the second IO pin 36 of the master device 28. Accordingly, the fifth slave device 30E will receive the first serial data signal SER_D1 first at the first IO pin 34, thereby causing the slave ID selection circuitry 42 of the fifth slave device 30E to associate a fourth slave device 30E with a fifth slave ID.

Finally, a sixth slave device 30F is coupled to the serial communication bus 32 in a relatively similar manner to the third slave device 30C, except that the first IO pin 34 of the sixth slave device 30F is coupled to the first IO pin 34 of the master device 28 and the second IO pin 36 of the sixth slave device 30F is coupled to second IO pin 36 of the master device 28. Accordingly, the sixth slave device 30F will receive the first serial data signal SER_D1 first on the first IO pin 34, thereby causing the slave ID selection circuitry 42 of the sixth slave device 30F to associate the sixth slave device 30F with a sixth slave ID. Table 4 details the unique slave IDs available to each slave device 30 when using the serial communication system 26 shown in FIG. 6.

TABLE 4

| Slave ID | First IO Pin | Second IO Pin | Third IO Pin |
|---|---|---|---|
| 0 | $V_{DD}$ | SER_D1 | SER_D2 |
| 1 | SER_D2 | $V_{DD}$ | SER_D1 |
| 2 | SER_D2 | SER_D1 | $V_{DD}$ |
| 3 | $V_{DD}$ | SER_D2 | SER_D1 |
| 4 | SER_D1 | $V_{DD}$ | SER_D2 |
| 5 | SER_D1 | SER_D2 | $V_{DD}$ |

Although the aforementioned serial communication systems 26 utilize the pin at which the supply voltage ($V_{DD}$) is provided to determine a slave ID for a slave device 30, the concepts described herein can be used to change any properties of the slave device 30. For example, the pin at which the supply voltage ($V_{DD}$) is applied can be used to change a product ID associated with the slave device 30 used to identify the device on mobile industry processor interface (MIPI) RF front end (RFFE) communication busses, or may change one or more operating parameters of the slave device 30. In one embodiment, the pin at which the supply voltage ($V_{DD}$) is delivered is used to select or determine a time-slot in a time division multiple access (TDMA) communication system.

In one embodiment, the master device 28 is a transceiver in a radio frequency (RF) front end. The slave devices 30 may include one or more RF power amplifiers (PAs), one or more RF switches, direct current (DC) to DC converter circuitry, one or more communication bridges, one or more communication translators, and one or more RF filters. As discussed above, the operating parameters of the slave devices 30 may be changed based on the IO pin to which the supply voltage ($V_{DD}$) is provided. For example, instead of or in addition to changing the slave ID of the device, the gain of an RF PA, the switching behavior of an RF switch, or the filtering characteristics of an RF filter may be changed using the concepts described above.

Figure 7:
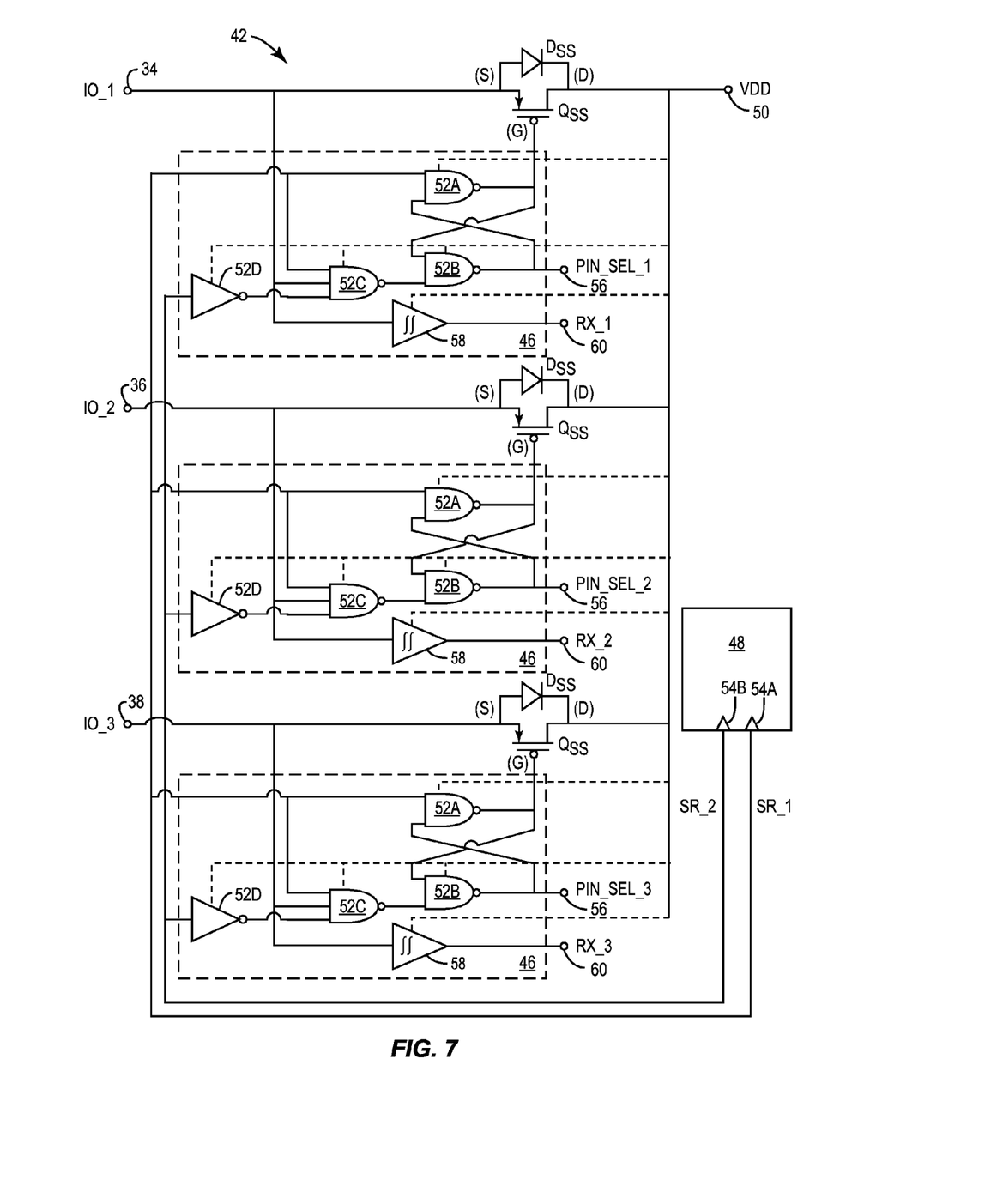
FIG. 7 illustrates details of slave identifier (ID) selection circuitry according to one embodiment of the present disclosure.

FIG. 7 shows details of the slave ID selection circuitry 42 according to one embodiment of the present disclosure. For each one of the first IO pin 34, the second IO pin 36, and the third IO pin 38, the slave ID selection circuitry 42 includes a slave ID selection transistor $Q_{SS}$, a slave ID selection diode $D_{SS}$, a latch 46, and set/reset circuitry 48. The slave ID selection transistor $Q_{SS}$ may be a p-channel metal-oxide-semiconductor field-effect transistor (MOSFET) including a source contact (S) coupled to the respective IO pin, a drain contact (D) coupled to a supply voltage ($V_{DD}$) node 50, and a gate contact (G). The slave ID selection diode $D_{SS}$ includes an anode coupled to the source contact (S) of the slave ID selection transistor $Q_{SS}$ and a cathode coupled to the drain contact (D) of the slave ID selection transistor $Q_{SS}$. The latch 46 includes a number of latch logic gates 52. A first one of the latch logic gates 52A includes a first input coupled to a first output 54A of the set/reset circuitry 48, a second input coupled to an output of a second one of the latch logic gates 52B, and an output coupled to the gate contact (G) of the slave ID selection transistor $Q_{SS}$. The second one of the latch logic gates 52B includes a first input coupled to an output of the first one of the latch logic gates 52A, a second input coupled to an output of a third one of the latch logic gates 52C, and an output coupled to a pin selection output node 56. The third latch logic gate 52C includes a first input coupled to the first input of the first latch logic gate 52A, a second input coupled to the source contact (S) of the slave ID selection transistor $Q_{SS}$, and a third input coupled to the output of a fourth latch logic gate 52D. The fourth latch logic gate 52D includes an input coupled to a second output 54B of the set/reset circuitry 48. In one embodiment, the first latch logic gate 52A, the second latch logic gate 52B, and the third latch logic gate 52C are NAND logic gates, while the fourth latch logic gate 52D is an inverter. However, any suitable logic circuitry may be used for the latch logic gates 52 without departing from the principles of the present disclosure. A Schmitt trigger 58 may additionally be coupled between the source contact (S) of the slave ID selection transistor $Q_{SS}$ and a serial signal output node 60.

Figure 8:
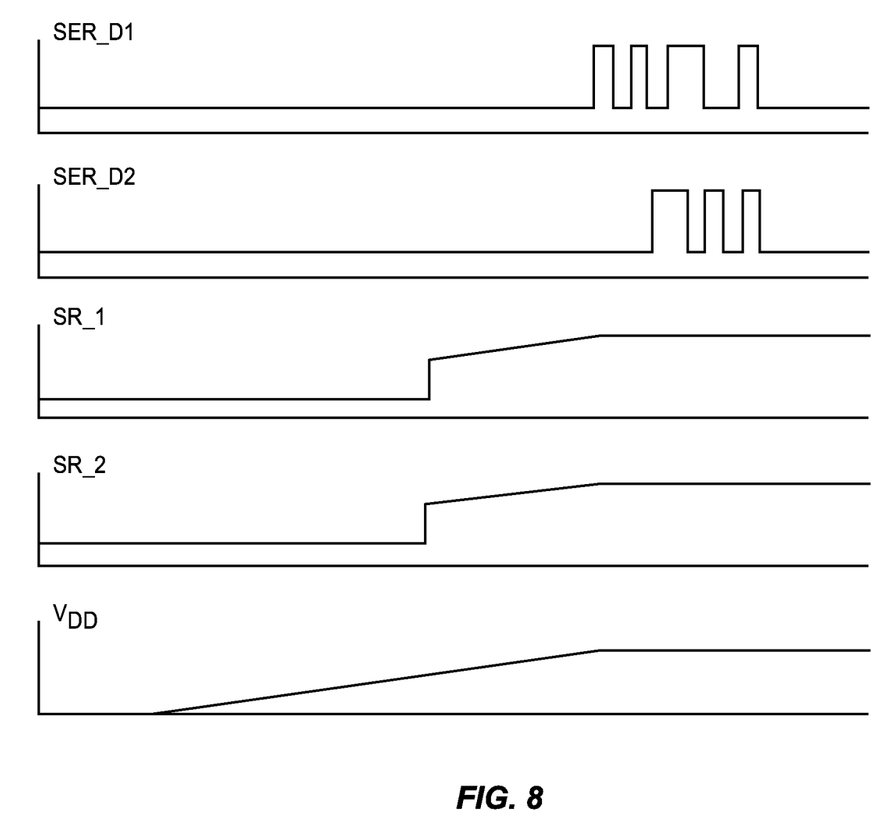
FIG. 8 is a graph illustrating operation of the slave ID selection circuitry shown in FIG. 7 according to one embodiment of the present disclosure.

FIG. 8 shows details of the operation of the slave ID selection circuitry 42 in the first slave device 30A shown in FIG. 4. In operation, when the supply voltage ($V_{DD}$) from the first IO pin 34 of the master device 28 is ramping up, a first set/reset signal SR_1 at the first output 54A and a second set/reset signal SR_2 at the second output 54B of the set/reset circuitry 48 are low, thereby resetting each one of the latches 46 to produce a high output at the gate contact (G) of the slave ID selection transistor $Q_{SS}$ and a low output at the pin selection output node 56. Since the slave ID selection transistor $Q_{SS}$ is a p-channel MOSFET, a high signal provided at the gate contact (G) of the slave ID selection transistor $Q_{SS}$ maintains the transistor in an OFF state. As the supply voltage ($V_{DD}$) rises above the threshold voltage of the slave ID selection diode $D_{SS}$ and thus is presented (with a slight voltage drop across the slave ID selection diode $D_{SS}$) at the supply voltage ($V_{DD}$) node 50, the first output 54A and the second output 54B of the set/reset circuitry 48 switch from low to high. This causes each one of the latches 46 to sample the value on the IO pin to which they are coupled. In the case of the first slave device 30A shown in FIG. 4, the latch 46 associated with the first IO pin 34 will produce a low output at the gate contact (G) of the connected slave ID selection transistor $Q_{SS}$ and a high output at the pin selection output node 56 since the supply voltage ($V_{DD}$) is received at the first IO pin 34. The low signal provided at the gate contact (G) of the slave ID selection transistor $Q_{SS}$ turns the slave ID transistor $Q_{SS}$ ON and passes the entirety of the supply voltage ($V_{DD}$) to the supply voltage ($V_{DD}$) node 50. The signal presented at the pin selection output node 56 is opposite that of the signal presented to the gate contact (G) of the slave ID selection transistor $Q_{SS}$.

Because the signals at the second IO pin 36 and the third IO pin 38 are held low by the master device 28, the latches 46 associated with these IO pins will keep the slave ID selection transistor $Q_{SS}$ to which they are coupled OFF. When the second output 54B of the set/reset circuitry 48 switches from low to high, the values of the latches 46 are locked in. In the case of the first slave device 30A shown in FIG. 4, this means that the slave ID selection transistor $Q_{SS}$ associated with the first IO pin 34 is locked ON to forward the supply voltage ($V_{DD}$) to the supply voltage ($V_{DD}$) node, while the slave ID selection transistors $Q_{SS}$ associated with the second IO pin 36 and the third IO pin 38 are locked OFF. The slave ID selection circuitry 42 will remain in this state until power is removed from the circuitry. Accordingly, the supply voltage ($V_{DD}$) supplies power to the slave device 30 via the first IO pin 34, while serial data signals presented at the second IO pin 36 and the third IO pin 38 are forwarded for further processing via their respective Schmitt triggers 58.

Figure 9:
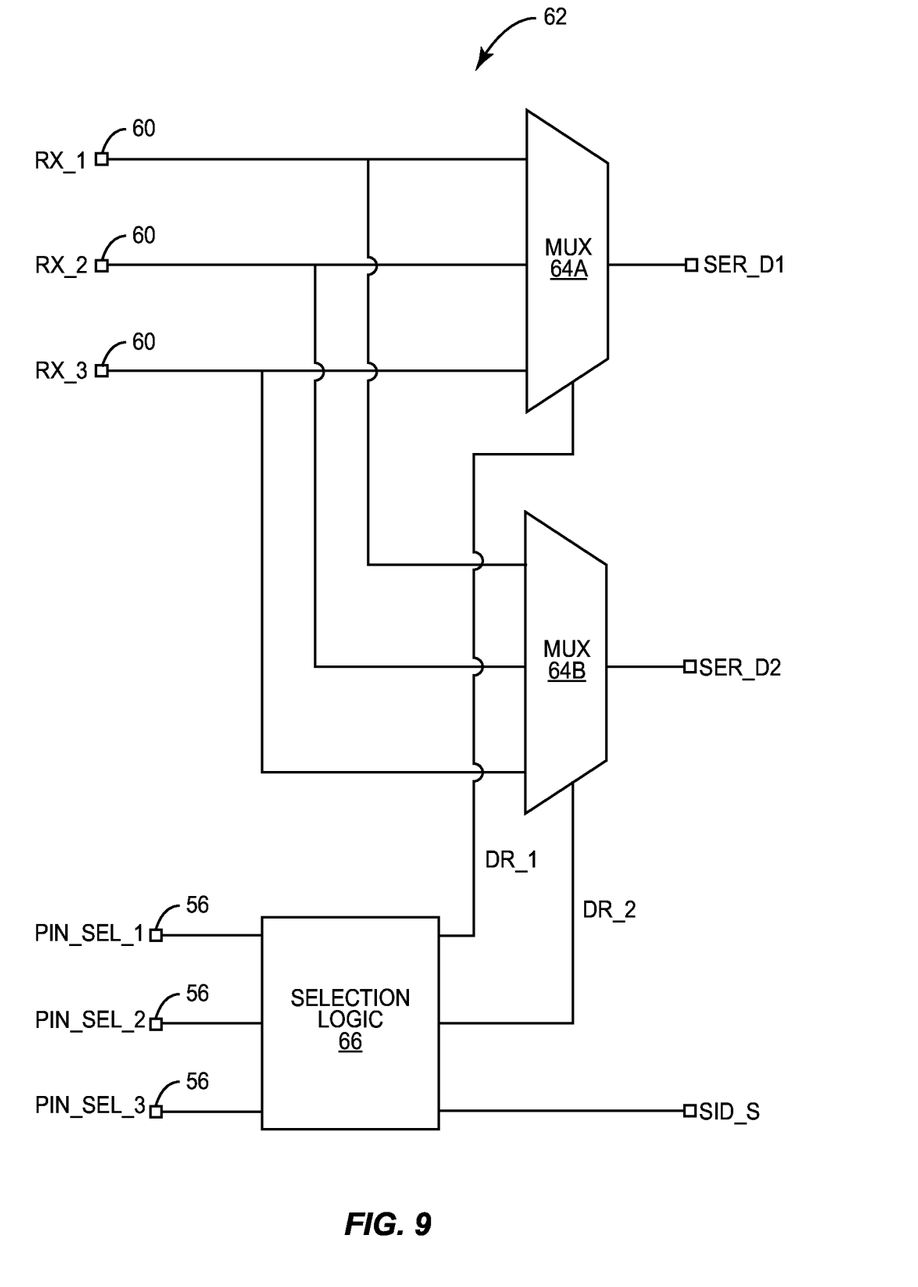
FIG. 9 illustrates further details of the slave ID selection circuitry shown in FIG. 7 according to one embodiment of the present disclosure.

FIG. 9 shows data routing circuitry 62 that may be part of the slave ID selection circuitry 42 according to one embodiment of the present disclosure. As shown in FIG. 9, the data routing circuitry 62 includes a first multiplexer 64A, a second multiplexer 64B, and selection logic circuitry 66. The first multiplexer 64A and the second multiplexer 64B include a number of inputs coupled to the serial signal output nodes 60 for each IO pin in the slave device 30. The selection logic circuitry 66 is coupled to the pin selection output nodes 56 for each IO pin in the slave device 30. As discussed above, the signal presented at the pin selection output node 56 is opposite that presented to the gate contact (G) of the slave ID selection transistor $Q_{SS}$. Accordingly, only the pin selection output node 56 associated with the IO pin at which the supply voltage ($V_{DD}$) is received will be a high signal. The selection logic circuitry 66 can thus determine from which one of the IO pins the supply voltage ($V_{DD}$) was received, and thus produces a slave ID selection signal SID_S, a first data routing control signal DR_1, and a second data routing control signal DR_2 based thereon. The slave ID selection signal SIDS is used by the slave device 30 to determine the slave ID to associate with the device. The first data routing control signal DR_1 and the second data routing control signal DR_2 are used by the first multiplexer 64A and the second multiplexer 64B, respectively, in order to appropriately route each of the serial data signals to an appropriate input of additional serial communication circuitry (not shown) in the slave device 30.

Those skilled in the art will recognize improvements and modifications to the embodiments of the present disclosure. All such improvements and modifications are considered within the scope of the concepts disclosed herein and the claims that follow.

What is claimed is:

1. A slave device comprising:
   a memory storing a slave identifier (ID), which identifies the slave device to other devices in a serial communication system;
   at least two input/output (TO) pins each configured to accept either a supply voltage or a serial communication signal; and
   slave ID selection circuitry configured to change the slave ID based on which one of the IO pins is coupled to the supply voltage.

2. The slave device of claim 1 wherein the slave device is powered by the supply voltage delivered via the IO pin coupled to the supply voltage.

3. The slave device of claim 1 further comprising serial communication circuitry configured to use one of the IO pins not coupled to the supply voltage for serial communication.

4. The slave device of claim 1 wherein the slave device comprises at least three IO pins each configured to accept either a supply voltage or a serial communication signal.

5. The slave device of claim 4 further comprising serial communication circuitry configured to use at least two of the IO pins not coupled to the supply voltage for serial communication.

6. The slave device of claim 5 wherein the slave ID selection circuitry is further configured to change the slave ID based on which one of the at least two IO pins used by the serial communication circuitry for serial communication receives a serial communication signal first.

7. The slave device of claim 6 wherein the slave device further comprises at least one general purpose IO (GPIO) pin.

8. The slave device of claim 7 wherein the slave ID selection circuitry is further configured to change the slave ID based on a signal received at the at least one GPIO pin.

9. The slave device of claim 1 wherein the slave device further comprises at least one general purpose IO (GPIO) pin.

10. The slave device of claim 9 wherein the slave ID selection circuitry is further configured to change the slave ID based on a signal received at the at least one GPIO pin.

11. The slave device of claim 1 wherein the slave device includes one or more of a radio frequency (RF) tunable filter, RF switching circuitry, and an RF power amplifier (PA).

12. The slave device of claim 11 wherein the one or more of the RF tunable filter, the RF switching circuitry, and the RF PA are powered by the supply voltage delivered via the IO pin coupled to the supply voltage.

13. A serial communication system comprising:
    a master device; and
    a slave device comprising:
       a memory storing a slave identifier (ID), which identifies the device to other devices in the serial communication system;
       at least two input/output (TO) pins each configured to accept either a supply voltage or a serial communication signal; and
       slave ID selection circuitry configured to change the slave ID based on which one of the IO pins is coupled to the supply voltage.

14. The serial communication system of claim 13 wherein the slave device is powered by the supply voltage delivered via the IO pin coupled to the supply voltage.

15. The serial communication system of claim 13 wherein the slave device further comprises serial communication circuitry configured to use one of the IO pins not coupled to the supply voltage for serial communication.

16. The serial communication system of claim 13 wherein the slave device comprises at least three IO pins.

17. The serial communication system of claim 16 wherein the slave device further comprises serial communication circuitry configured to use at least two of the IO pins not coupled to the supply voltage for serial communication.

18. The serial communication system of claim 17 wherein the slave ID selection circuitry is further configured to change the slave ID based on which one of the at least two TO pins used by the serial communication circuitry for serial communication receives a serial communication signal first.

19. The serial communication system of claim 18 wherein the slave device further comprises at least one general purpose IO (GPIO) pin.

20. The serial communication system of claim 19 wherein the slave ID selection circuitry is further configured to change the slave ID based on a signal received at the at least one GPIO pin.

21. The serial communication system of claim 13 wherein the slave device further comprises at least one general purpose IO (GPIO) pin.

22. The serial communication system of claim 21 wherein the slave ID selection circuitry is further configured to change the slave ID based on a signal received at the at least one GPIO pin.

23. The serial communication system of claim 13 wherein the master device is configured to send a serial communication message to the slave device by providing the slave ID in a serial communication message.

24. The slave device of claim 13 wherein the slave device includes one or more of a radio frequency (RF) tunable filter, RF switching circuitry, and an RF power amplifier (PA).

25. The slave device of claim 24 wherein the one or more of the RF tunable filter, the RF switching circuitry, and the RF PA are powered by the supply voltage delivered via the IO pin coupled to the supply voltage.

26. A serial communication system comprising:
    a master device; and
    a slave device comprising:
       a memory storing one or more operating parameters of the slave device;
       at least two input/output (IO) pins each configured to accept either a supply voltage or a serial communication signal; and
       operating parameter selection circuitry configured to change one or more operating parameters of the slave device based on which one of the IO pins is coupled to the supply voltage.

* * * * *

UNITED STATES PATENT AND TRADEMARK OFFICE
CERTIFICATE OF CORRECTION

PATENT NO. : 9,720,872 B2  
APPLICATION NO. : 14/511602  
DATED : August 1, 2017  
INVENTOR(S) : William David Southcombe et al.

Page 1 of 1

It is certified that error appears in the above-identified patent and that said Letters Patent is hereby corrected as shown below:

In the Specification

In Column 10, Line 62, replace "SIDS" with --SID_S--.

In the Claims

In Column 11, Line 13, replace "input/output (TO)" with --input/output (IO)--.

In Column 12, Line 1, replace "input/output (TO)" with --input/output (IO)--.

In Column 12, Line 23, replace "TO pins" with --IO pins--.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*